US008626429B2

(12) United States Patent
Santos et al.

(10) Patent No.: US 8,626,429 B2
(45) Date of Patent: Jan. 7, 2014

(54) ALLOCATION OF FLIGHT LEGS TO DISPATCHER POSITIONS

(75) Inventors: Cipriano A Santos, Modesto, CA (US); Ivan Adrian Lopez Sanchez, Sonora (MX); Xin Zhang, Fremont, CA (US); Glenn W Herrick, Miramar, FL (US); Mark D Raper, Tulsa, OK (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 13/397,280

(22) Filed: Feb. 15, 2012

(65) Prior Publication Data

US 2013/0211702 A1     Aug. 15, 2013

(51) Int. Cl.
*G06F 19/00*     (2011.01)

(52) U.S. Cl.
USPC ............................. 701/120; 701/121; 701/122

(58) Field of Classification Search
USPC .................................................. 701/120–122
See application file for complete search history.

(56) References Cited

U.S. PATENT DOCUMENTS

| | | | | |
|---|---|---|---|---|
| 4,692,869 A * | 9/1987 | King et al. | ..................... | 701/467 |
| 5,714,948 A * | 2/1998 | Farmakis et al. | ............. | 340/961 |
| 6,314,362 B1 * | 11/2001 | Erzberger et al. | ............. | 701/120 |
| 6,347,263 B1 * | 2/2002 | Johnson et al. | ................. | 701/14 |
| 6,868,314 B1 * | 3/2005 | Frink | ................................ | 701/3 |
| 6,873,903 B2 | 3/2005 | Baiada et al. | | |
| 7,010,398 B2 * | 3/2006 | Wilkins et al. | .................... | 701/3 |
| 7,240,018 B2 | 7/2007 | Thengvall et al. | | |
| 7,340,405 B1 | 3/2008 | Gunther et al. | | |
| 7,664,596 B2 * | 2/2010 | Wise et al. | ..................... | 701/120 |
| 8,019,617 B2 | 9/2011 | Kocis et al. | | |
| 8,332,084 B1 * | 12/2012 | Bailey et al. | ..................... | 701/10 |
| 2005/0187677 A1 * | 8/2005 | Walker | ............................. | 701/16 |
| 2006/0025900 A1 * | 2/2006 | Arnouse | ........................ | 701/10 |
| 2007/0078572 A1 * | 4/2007 | Deker et al. | ....................... | 701/3 |
| 2007/0129855 A1 * | 6/2007 | Coulmeau | ......................... | 701/3 |
| 2009/0082954 A1 * | 3/2009 | Ridenour, II | .................. | 701/206 |
| 2009/0150012 A1 * | 6/2009 | Agam et al. | ....................... | 701/3 |
| 2009/0265090 A1 * | 10/2009 | Poe et al. | ....................... | 701/120 |
| 2010/0231418 A1 * | 9/2010 | Whitlow et al. | .............. | 340/945 |
| 2011/0144832 A1 * | 6/2011 | McDowell et al. | ............... | 701/3 |
| 2011/0196564 A1 * | 8/2011 | Coulmeau | ........................ | 701/26 |
| 2012/0029737 A1 * | 2/2012 | Marty et al. | ....................... | 701/3 |
| 2012/0078495 A1 * | 3/2012 | Hamblin et al. | ............... | 701/120 |
| 2013/0226373 A1 * | 8/2013 | Bollapragada et al. | ........... | 701/3 |

FOREIGN PATENT DOCUMENTS

CN     101582204     11/2009

OTHER PUBLICATIONS

Lee et al., Flight Assignment Plan for an Air Cargo Inbound Terminal, IEEE, 2010, pp. 1872-1881.

* cited by examiner

*Primary Examiner* — Calvin Cheung

(57) ABSTRACT

A method includes receiving flight leg data and dispatcher position data for a planning horizon and identifying cycle flight legs and extraordinary flight legs based on the flight leg data. The method includes allocating each cycle flight leg to at least one dispatcher position while minimizing workload deviations between the dispatcher positions. The method includes allocating, after allocating each cycle flight leg, each extraordinary flight leg to at least one dispatcher position while minimizing workload deviations between the dispatcher positions.

11 Claims, 8 Drawing Sheets

| POSITION-ID (902) | FLIGHT-LEG-ID (904) | DAY (906) | HOUR-ID (908) | EFFORT (MIN) (910) |
|---|---|---|---|---|
| 12 | FLIGHT 100 | Tue | 201101181500 | 1.00 |
| 12 | FLIGHT 100 | Tue | 201101181600 | 1.00 |
| 12 | FLIGHT 100 | Tue | 201101181700 | 1.00 |
| 12 | FLIGHT 100 | Tue | 201101181800 | 1.00 |
| 12 | FLIGHT 100 | Tue | 201101181900 | 1.00 |
| 12 | FLIGHT 100 | Tue | 201101182000 | 1.00 |
| 12 | FLIGHT 100 | Tue | 201101182100 | 1.00 |

Fig. 9

ALLOCATION OF FLIGHT LEGS TO DISPATCHER POSITIONS

BACKGROUND

Airlines employ aircraft dispatchers for planning flights prior to takeoff and for following flights after takeoff. An aircraft dispatcher has joint responsibility with an aircraft captain for the safety and operational control of flights assigned to the dispatcher. The dispatcher, among other responsibilities, authorizes, regulates, and controls airline flights according to government and company regulations to expedite and ensure the safety of each flight. The dispatcher is also responsible for economics, passenger service, and operational control of day to day flight operations. The aircraft dispatchers should be utilized as efficiently as possible to control airline costs while maintaining the safety of each flight.

BRIEF DESCRIPTION OF THE DRAWINGS

FIG. 9 is a table illustrating one example of a flight-position allocation report.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined with each other, unless specifically noted otherwise.

Figure 1:
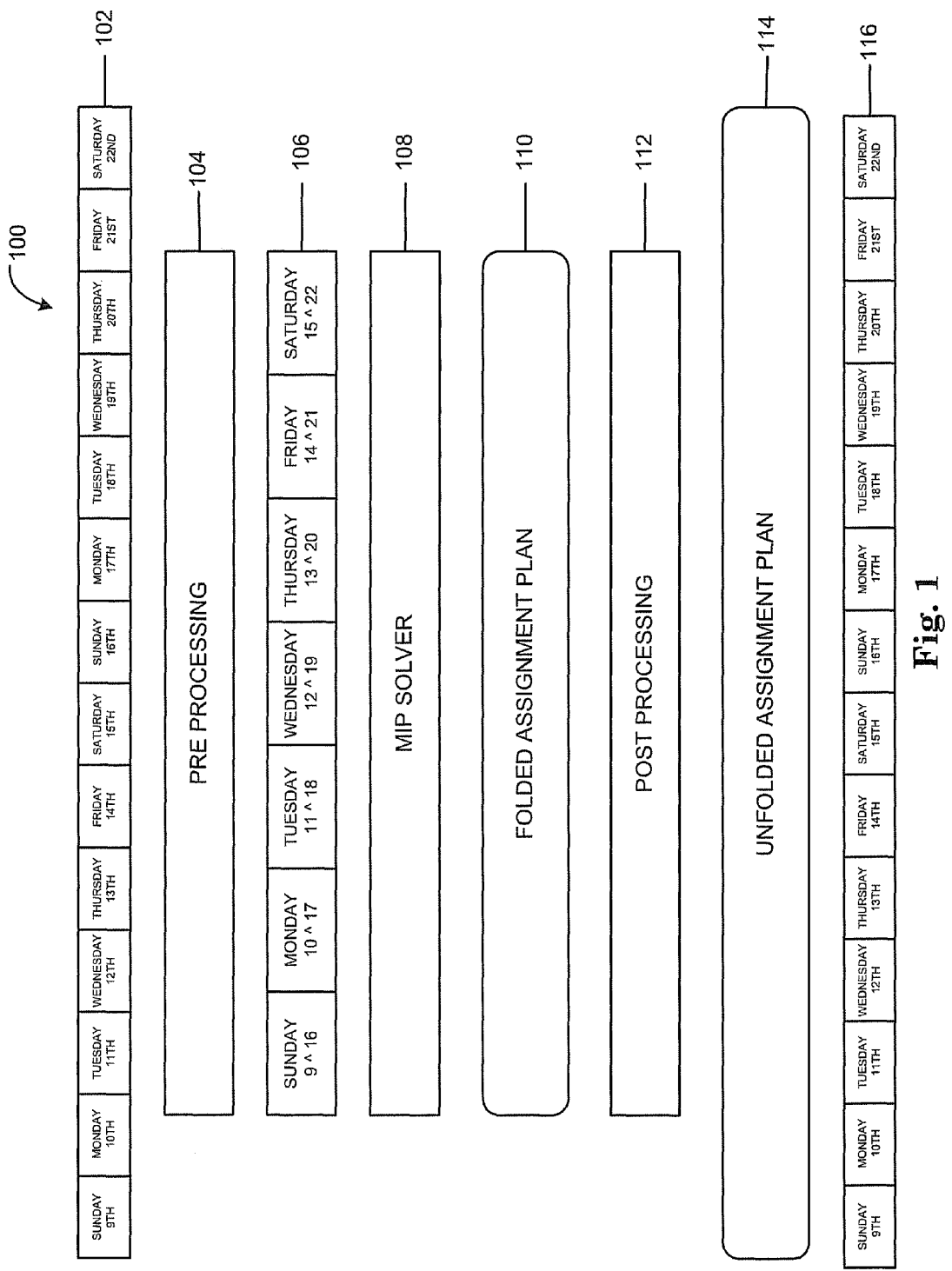
FIG. 1 is a functional block diagram illustrating one example of a dispatcher workload distribution system.

FIG. 1 is a functional block diagram illustrating one example of a dispatcher workload distribution system 100. Dispatcher workload distribution system 100 is used to assign flight legs to available dispatcher positions for a planning horizon. A planning horizon is a specified period of time, such as 30 days or another suitable period of time. Dispatcher workload distribution system 100 balances the workload for each dispatcher position at each hour of each day over the planning horizon. Dispatcher workload distribution system 100 utilizes a Mixed Integer Programming (MIP) model to optimally balance the workload over the dispatcher positions at each hour of each day during the planning horizon.

Since the MIP model for the dispatcher workload distribution system could be very large due to millions of binary variables over a planning horizon, dispatcher workload distribution system 100 decomposes the optimization problem into smaller more manageable sub-problems. Dispatcher workload distribution system 100 optimizes the allocation of dispatcher positions to the workload (i.e., effort) for each flight leg during the planning horizon. In this way, dispatcher workload distribution system 100 increases safety since by optimizing the dispatcher workload distribution, the dispatchers are less stressed, thus reducing human error. In addition, less stressed dispatchers increase the efficiency of airline operations.

In one example, the planning horizon is 30 days and there are approximately 1000 flight legs each day. In addition, in one example, there are between 20 and 30 dispatcher positions open (i.e., scheduled to work) at various times of each day and week of the planning horizon. In one example, some dispatcher positions are open 24 hours a day. In other examples, the planning horizon, the number of flight legs, and the number of open dispatcher positions vary based on the airline.

The collection of flight legs for a planning horizon is predetermined, and is an input to dispatcher workload distribution system 100. In one example, each flight leg has the following attributes:
Flight Number
Flight Start Date
Departure Station Code
Arrival Station Code
International Flight Leg Indicator (i.e., International or Domestic)
Start Of Planning Time
Scheduled Dispatcher Release Time
Scheduled Arrival Time Each individual flight leg has an hourly calendar that represents the life of the flight leg. The life of each flight leg has two main periods including a pre-flight (planning) period and an in-flight (following) period. The planning period is from the Start of Planning Time to the Scheduled Dispatcher Release Time. The Following Period is from the Scheduled Dispatcher Release Time to the Scheduled Arrival Time. The effort (i.e., workload) used for a flight leg is the total working effort (e.g., the number of minutes) for each particular hour of the flight (i.e., the actual calendar date and hour). In one example, there are three types of effort:
Planning
Planning And Following (i.e., there is planning and following effort at the same hour)
Following The effort for each specific flight leg is predetermined. In one example, the predetermined effort is based upon the flight duration, whether the flight is an international or domestic flight, station characteristics, and seasonal considerations. In other examples, the predetermined effort is based upon other suitable considerations. The effort for the planning and following periods can be different for a flight leg.

The collection of dispatcher positions (i.e., the working schedule and number of positions) for the planning horizon is also predetermined and is provided as an input to dispatcher workload distribution system 100.

In one example, each dispatcher position has the following attributes:

Position Number
Open Time (i.e., scheduled work start time)
Close Time (i.e., scheduled work stop time)
Frequency (i.e., days of the week position is open)
International Position Indicator (i.e., international or domestic)
Utilization Percent (Normally 100%, 60 minutes per hour, but can be less for a dispatcher position that has other responsibilities.)
Over Utilization Percent (Percentage a position can be over-utilized in any hour.)

Each individual dispatcher position has an hourly calendar that represents the working schedule for the position. Each hourly calendar contains the maximum number of minutes per hour that the position is available to perform work as normal utilization during each day and hour of the planning horizon. A dispatcher position can be allowed to be over utilized up to a maximum number of minutes.

In one example, the following constraints and rules are followed by dispatcher workload distribution system 100 when allocating flight leg effort to a set of open dispatcher positions throughout the life of the flight.

The amount of work assigned to each dispatcher position for each hour should not vary significantly from position to position.

All effort for a flight leg during the life of the flight should be assigned to a single dispatcher position as much as possible.

If a single dispatcher position cannot be identified to accommodate all of the effort for the flight leg, the flight leg effort can be split between two or three positions, at different hours during the life of the flight, according to the following rules:

The entire planning period where the effort type is Planning or Planning and Following, is assigned to the first dispatcher position.

The first dispatcher position is closing during the following period of the flight. The first dispatcher position is closing if there is a sequential break in the working hours of the position. The following period can be assigned to a second or third dispatcher position in this situation.

All flight legs for a specific first dispatcher position that are assigned to a second or third dispatcher position when the first dispatcher position closes should use the same second and/or third dispatcher positions as consistently as possible.

The number of unassigned flight legs should be minimized.

Flight legs that are repeated on different dates with the same flight number and the same arrival and departure stations (i.e., daily flight legs) should be assigned to the same dispatcher position as often as possible over the planning horizon.

Some flight legs may be pre-assigned to specific dispatcher positions prior to the general distribution of the flight legs. Pre-assignment of flight legs to specific dispatcher positions may be based on preferences of the user of workload distribution system 100.

The maximum dispatcher position utilization, including normal capacity plus over capacity, during any hour should not be exceeded.

In one example, dispatcher workload distribution system 100 implements the above constraints and rules to achieve the following optimization aims:

1) Evenness: Minimize the deviation of all dispatcher positions assigned effort for each hour of each day. The amount of work assigned to each dispatcher position should not vary significantly from position to position with consideration to the normal capacity of the position. That is, all active positions at each hour of each day should have the same or similar effort allocated to them.
2) Consistency: Assign daily flight legs to the dispatcher position(s) with open times corresponding to the daily flight leg the greatest number of times over the planning horizon. That is, all replicas or duplicates of a flight leg should be allocated to the same first dispatcher position for each day of the planning horizon; and all closing positions should complete all the effort of all the flight legs they are allocated.
3) Minimize Assignments: Minimize the number of dispatcher positions assigned to a flight leg (i.e., limit the usage of second and third dispatcher positions). The planning and following periods of a flight leg should be assigned to a single dispatcher position. The planning period of a flight leg cannot be split. In addition, there should be at most three dispatcher positions allocated to a flight leg.
4) Completeness: Minimize the remaining flight leg effort of unassigned flight legs. All flight leg effort should be fulfilled by an open dispatcher position (i.e. there should be no remaining unassigned flight legs).

There are conflicts and therefore trade-offs between these four optimization aims. Specifically, there is a trade-off between the Evenness aim and the Consistency/Minimize Assignments aims. The Consistency/Minimize Assignments aims may consume capacity from dispatcher positions with large capacity, typically positions that are open 24 hours, leaving positions with little capacity idle, consequently hurting the Evenness aim. Conversely, the Evenness aim may split flight legs to consume the capacity of all positions with large and small capacity, hence hurting the Consistency/Minimize Assignments aims.

Dispatcher workload distribution system 100 thus utilizes a MIP model to optimally balance the workload over the dispatcher positions at each hour of each day of the planning horizon. The main decision variable of the MIP model is a binary variable that determines if a dispatcher position fulfills completely the effort of a flight leg at a given hour during the life of the flight leg. The objective function is to minimize the summation, over each hour of the planning horizon, of the absolute value of the difference between the utilization of a dispatcher position open at an hour and the average utilization of all open dispatcher positions at that hour.

In one example, the constraints of the MIP model are as follows:

1) Satisfy the effort of all flight legs during the planning horizon. For each hour during the life of the flight leg, allocate a dispatcher position to fulfill the effort, otherwise declare the effort at such hours as unfilled.
2) Compute the total effort allocated at each open dispatcher position for each hour of the planning horizon.
3) For each open dispatcher position at each hour of the planning horizon, the total effort allocated should be less than or equal to the regular capacity plus overtime.
4) For each open dispatcher position at each hour of the planning horizon, the overtime allocated to satisfy total effort allocated should be less than or equal to a maximum limit of over capacity.
5) For each open dispatcher position at each hour of the planning horizon, compute the absolute value of the difference between the utilization of the open dispatcher position at the hour and the average utilization of all open dispatcher positions at that hour.

6) For each open dispatcher position and a flight leg, indicate if such position has been allocated to the flight leg at any hour during the life of the flight leg.
7) For each flight leg, assign at most three dispatcher positions to fulfill the effort during each hour of the life of the flight leg.
   a. For each open dispatcher position and a flight leg, ensure that all the effort during hours of the planning period is fulfilled by the same single dispatcher position.
   b. For each open dispatcher position and a flight leg, indicate if a single position has been used to fulfill all the effort during the life of the flight leg.

The rest of the constraints of the MIP formulation are logical constraints that ensure that the flight leg splitting rules are properly considered. The MIP model could be very large due to millions of binary variables. Therefore, dispatcher workload distribution system 100 decomposes the problem. There are two main types of flights: cycle flights and extraordinary flights. Cycle flights repeat at several days during the planning horizon with exactly the same planning and following hours and the same effort at each hour. Extraordinary flights are non-cycle flights (i.e., flights that do not repeat during the planning horizon).

For the cycle flights, dispatcher workload distribution system 100 aggregates or folds all the flights that repeat at several days during the planning horizon into a single period termed a meta-period. In one example, all the flights that repeat at several days during the planning horizon are aggregated or folded into a single week, termed a meta-week. In this way, dispatcher workload distribution system 100 defines the Monday flights as the flights that are identical at all Mondays during the planning horizon. Similarly, dispatcher workload distribution system 100 defines the Tuesday, Wednesday . . . and Sunday flights. Hence, one flight partition will be the flights that repeat at all days of the meta-period or meta-week, plus all the additional days in the planning horizon.

In this example, the planning horizon as indicated at 102 in FIG. 1 starts on Sunday the $9^{th}$ and finishes on Saturday the $22^{nd}$. Dispatcher workload distribution system 100 includes a pre-processing phase as indicated at 104 that aggregates the flight legs that are identical on each day of the meta-week (i.e., Sunday, Monday, . . . Friday, Saturday) so that the Sunday flights include the flight legs that are identical on Sunday the $9^{th}$ and $16^{th}$, the Monday flights include the flight legs that are identical on Monday the $10^{th}$ and $17^{th}$, etc., as indicated at 106.

For each of these partitions, dispatcher workload distribution system 100 generates a sub-partition of flights that have the same planning and following hours. For example, a partition F5_7 represents a cycle flight that repeats five days of the meta-week and has a planning and following duration of seven hours. Partitions are ordered by higher repetition to lower repetition, and for each of these partitions, the sub-partitions are ordered by longer duration to shorter duration.

Dispatcher workload distribution system 100 then solves a first series of MIP problems for the cycle flights via a MIP solver 108 considering the flight partitions and sub-partitions described above and the constraints and rules previously described above. Dispatcher workload distribution system 100 solves one flight partition at a time in the order described above. In this example, the planning horizon for the cycle flights MIP problem is a meta-week. The main output of the solution to the MIP problem is a folded assignment plan 110, which provides flight-position allocations for each hour during the life of each flight leg and indicates any flight effort that could not be fulfilled during the life of each flight leg. Given the flight-position allocations, dispatcher workload distribution system 100 computes the total effort allocated at each open position and hour of the meta-week in a post processing phase as indicated at 112.

The post processing phase 112 also provides an unfolded assignment plan 114. Dispatcher workload distribution system 100 unfolds the total effort allocated at each open dispatcher position and hour of the meta-week into the hours of the original planning horizon, and computes the remaining capacity available (regular and over capacity) at each open dispatcher position and hour of the original planning horizon. The remaining capacity is available to assign to the extraordinary flights. Dispatcher workload distribution system 100 creates flight partitions based on the duration of the extraordinary flights (i.e., the number of planning and following hours).

Dispatcher workload distribution system 100 then solves a second series of MIP problems for the extraordinary flights using MIP solver 108 considering the flight partitions from longer duration to shorter duration and the remaining capacity to provide a schedule for the original planning horizon as indicated at 116.

In one example, a MIP model for the cycle and extraordinary flights is implemented in General Algebraic Modeling System (GAMS), which is a mathematical modeling language. In one example, GAMS calls a solver (e.g., Gurobi) to solve the MIP model. In one example, the pre-processing phase indicated at 104 and the post-processing phase indicated at 112 are coded in c#.

Figure 2:
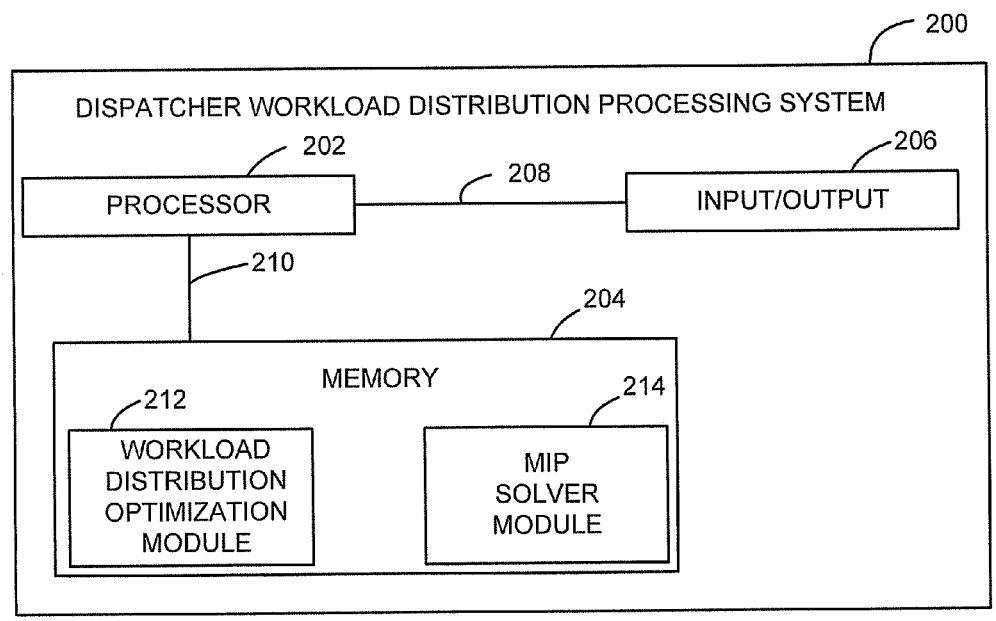
FIG. 2 is a block diagram illustrating one example of a dispatcher workload distribution processing system.

FIG. 2 is a block diagram illustrating one example of a dispatcher workload distribution processing system 200. In one example, dispatcher workload distribution processing system 200 is used to implement dispatcher workload distribution system 100 previously described and illustrated with reference to FIG. 1. Dispatcher workload distribution processing system 200 includes a processor 202, a memory 204, and input/output 206. Processor 202 is communicatively coupled to memory 204 via communication link 210. Processor 202 is communicatively coupled to input/output 206 via communication link 208.

Processor 202 includes a Central Processing Unit (CPU) or other suitable processor. In one example, memory 204 stores instructions executed by processor 202 for operating dispatcher workload distribution processing system 200. Memory 204 includes any suitable combination of volatile and/or non-volatile memory, such as combinations of Random Access Memory (RAM), Read-Only Memory (ROM), flash memory, and/or other suitable memory. Memory 204 stores instructions executed by processor 202 including instructions for a workload distribution module 212 and instructions for a MIP solver module 214. In one example, processor 202 executes instructions of workload distribution optimization module 212 to implement pre-processing 104 and post processing 112 previously described and illustrated with reference to FIG. 1. In one example, processor 202 executes instructions of MIP solver module 214 to implement MIP solver 108 previously described and illustrated with reference to FIG. 1.

Input/output 206 receives input data for assigning workload to dispatcher positions including the flight leg data and the available position data during a planning horizon. Input/output 206 outputs data indicating the allocation of the flight legs to the available positions during the planning horizon.

Figure 3:
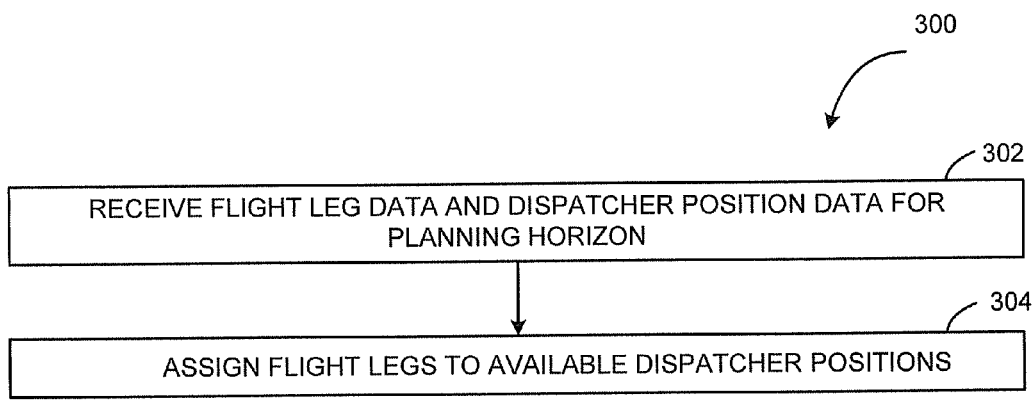
FIG. 3 is a flow diagram illustrating one example of a method for optimizing the distribution of workload to dispatcher positions.

FIG. 3 is a flow diagram illustrating one example of a method 300 for optimizing the distribution of workload to dispatcher positions. In one example, method 300 is implemented by dispatcher workload distribution processing system 200 previously described and illustrated with reference to FIG. 2. At 302, flight leg data and dispatcher position data for a specified planning horizon is received. In one example, the flight leg data and dispatcher position data for the specified planning horizon is received by input/output 206 of dispatcher workload distribution processing system 200. At 304, the flight legs are assigned to the available dispatcher positions. In one example, the flight legs are assigned to the available dispatcher positions by processor 202 of dispatcher workload distribution processing system 200 executing instructions of workload distribution optimization module 212 and MIP solver module 214. In one example, the flight legs are assigned to the available dispatcher positions based on the constraints and rules previously described above.

Figure 4:
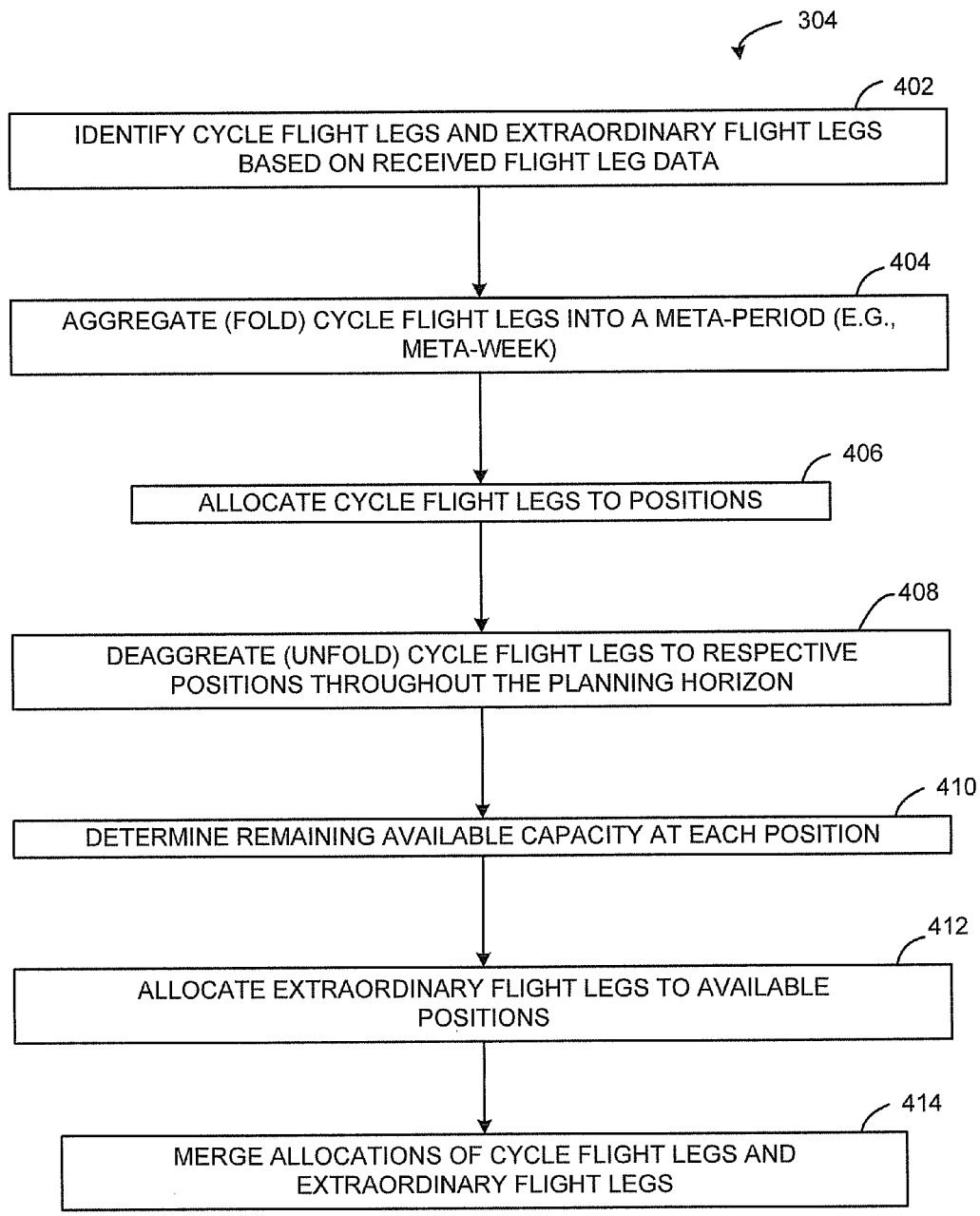
FIG. 4 is a flow diagram illustrating one example of a method for assigning flight legs to available dispatcher positions.

FIG. 4 is a flow diagram illustrating one example of a method 304 for assigning flight legs to available dispatcher positions. In one example, method 304 corresponds to block 304 of FIG. 3. At 402, the cycle flight legs and the extraordinary fight legs are identified based on the received flight leg data. At 404, the cycle flight legs are aggregated (i.e., folded) into a meta-period (e.g., meta-week). At 406, the cycle flight legs are allocated to dispatcher positions. At 408, the allocated cycle flight legs are deaggregated (i.e., unfolded) to respective positions throughout the planning horizon. At 410, the remaining available capacity at each dispatcher position is determined. At 412, the extraordinary flight legs are allocated to the available positions. At 414, the allocated cycle flight legs and the allocated extraordinary flight legs are merged for the planning horizon to provide the flight-position allocations for the planning horizon.

Figure 5:
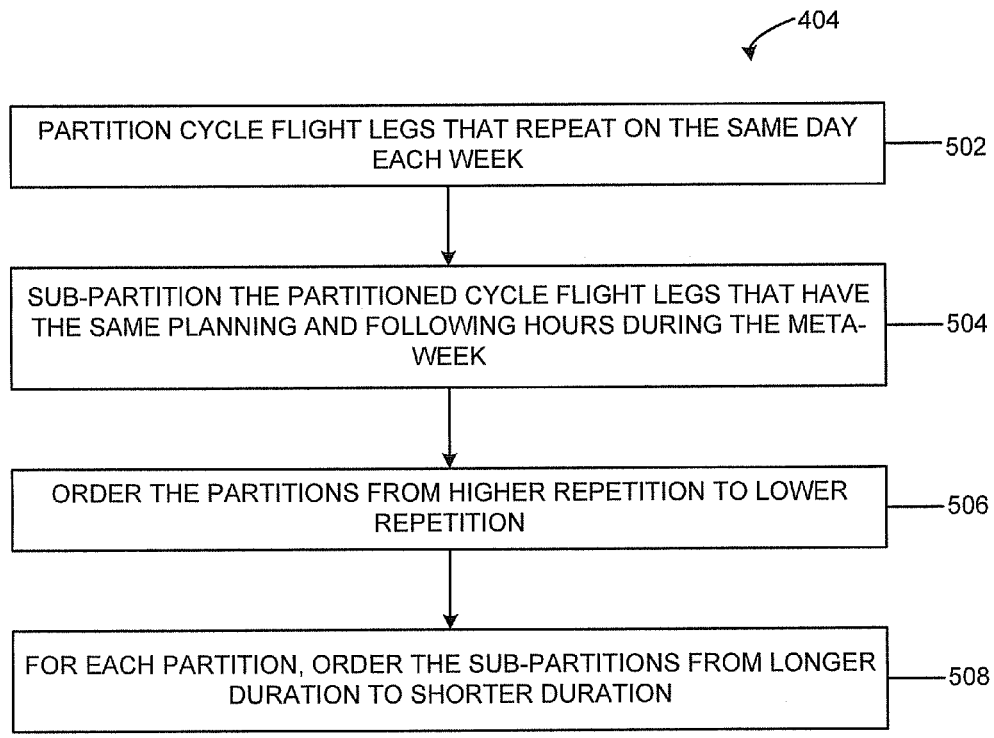
FIG. 5 is a flow diagram illustrating one example of a method for aggregating (i.e., folding) cycle flight legs into a meta-period (e.g., a meta-week).

FIG. 5 is a flow diagram illustrating one example of a method 404 for aggregating (i.e., folding) cycle flight legs into a meta-period (e.g., meta-week). In one example, method 404 corresponds to block 404 of FIG. 4. At 502, cycle flight legs that repeat on the same day each week of the planning horizon are partitioned. That is, each of the repeating Monday flight legs, each of the repeating Tuesday flight legs, etc. are grouped into a single day of the meta-week. At 504, the partitioned cycle flight legs that have the same planning and following hours during the meta-week are sub-partitioned. That is, each of the grouped flights for each day of the meta-week are further grouped within the meta-week based on having the same planning and following hours of a flight leg on another day(s) of the meta-week.

At 506, the partitions are ordered from higher repetition to lower repetition such that the partitions having a larger number of repeated flight legs are placed prior to the partitions having a smaller number of repeated flight legs. At 508, for each partition, the sub-partitions are ordered from longer duration to shorter duration such that the sub-partitions representing flight legs having a longer duration are placed prior to sub-partitions representing flights legs having a shorter duration. By ordering the partitions from higher repetition to lower repetition and the sub-partitions from longer duration to shorter duration, the flight legs having more effort to be allocated to dispatcher positions is allocated prior to flight legs having less effort to be allocated to dispatcher positions.

Figure 6:
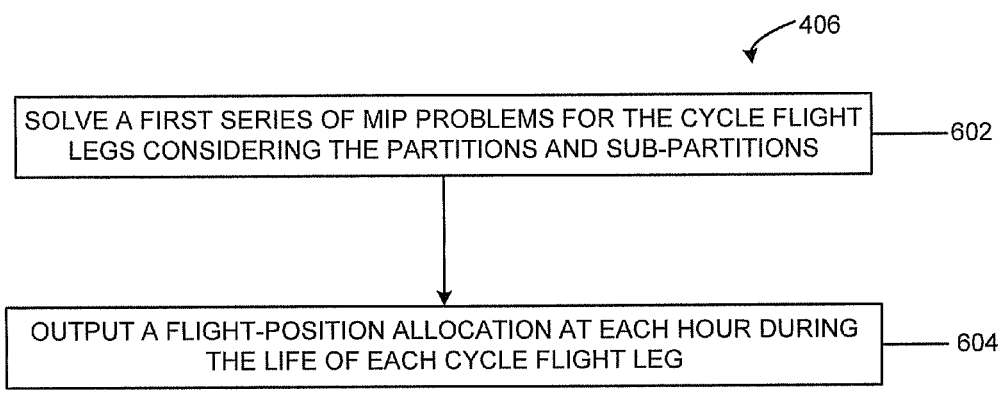
FIG. 6 is a flow diagram illustrating one example of a method for allocating cycle flight legs to dispatcher positions.

FIG. 6 is a flow diagram illustrating one example of a method 406 for allocating cycle flight legs to dispatcher positions. In one example, method 406 corresponds to block 406 of FIG. 4. At 602, a first series of MIP problems for the cycle flight legs is solved using a MIP solver considering the partitions and sub-partitions from method 404 previously described and illustrated with reference to FIG. 5 and the rules and constraints previously described above. At 604, a flight-position allocation at each hour during the life of each cycle flight leg is output by the MIP solver.

Figure 7:
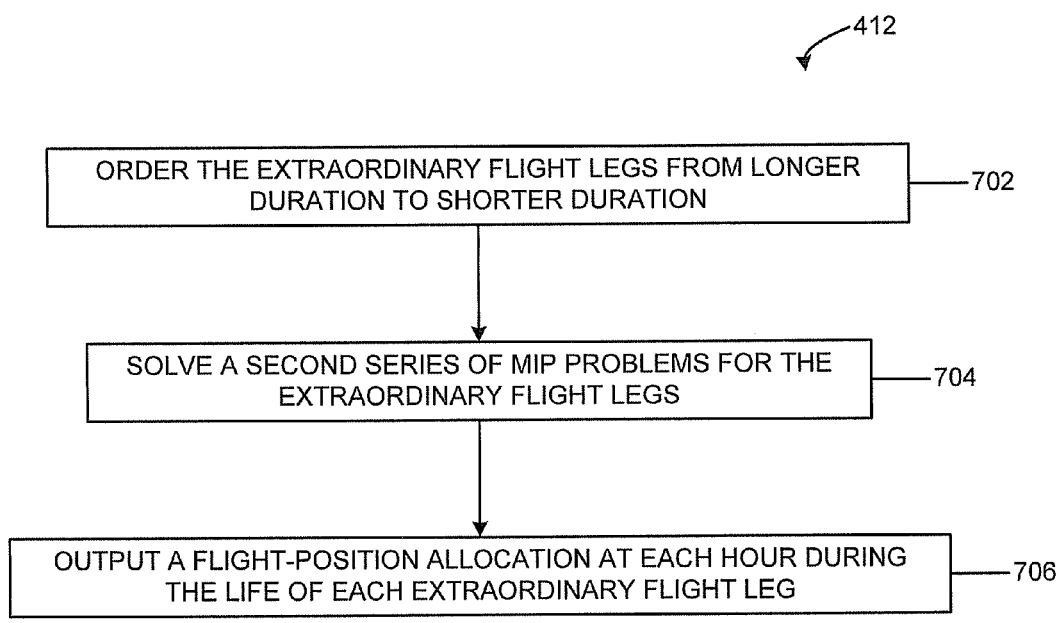
FIG. 7 is a flow diagram illustrating one example of a method for allocating extraordinary flight legs to available dispatcher positions.

FIG. 7 is a flow diagram illustrating one example of a method 412 for allocating extraordinary flight legs to available dispatcher positions. In one example, method 412 corresponds to block 412 of FIG. 4. At 702, the extraordinary flight legs are ordered from longer duration to shorter duration such that the flight legs having a longer duration are placed prior to flights legs having a shorter duration. By ordering the flight legs from longer duration to shorter duration, the flight legs having more effort to be allocated to dispatcher positions are allocated prior to flight legs having less effort to be allocated to dispatcher positions. At 704, a second series of MIP problems for the extraordinary flight legs is solved using a MIP solver. At 706, a flight-position allocation at each hour during the life of each extraordinary flight leg is output by the MIP solver.

Figure 8:
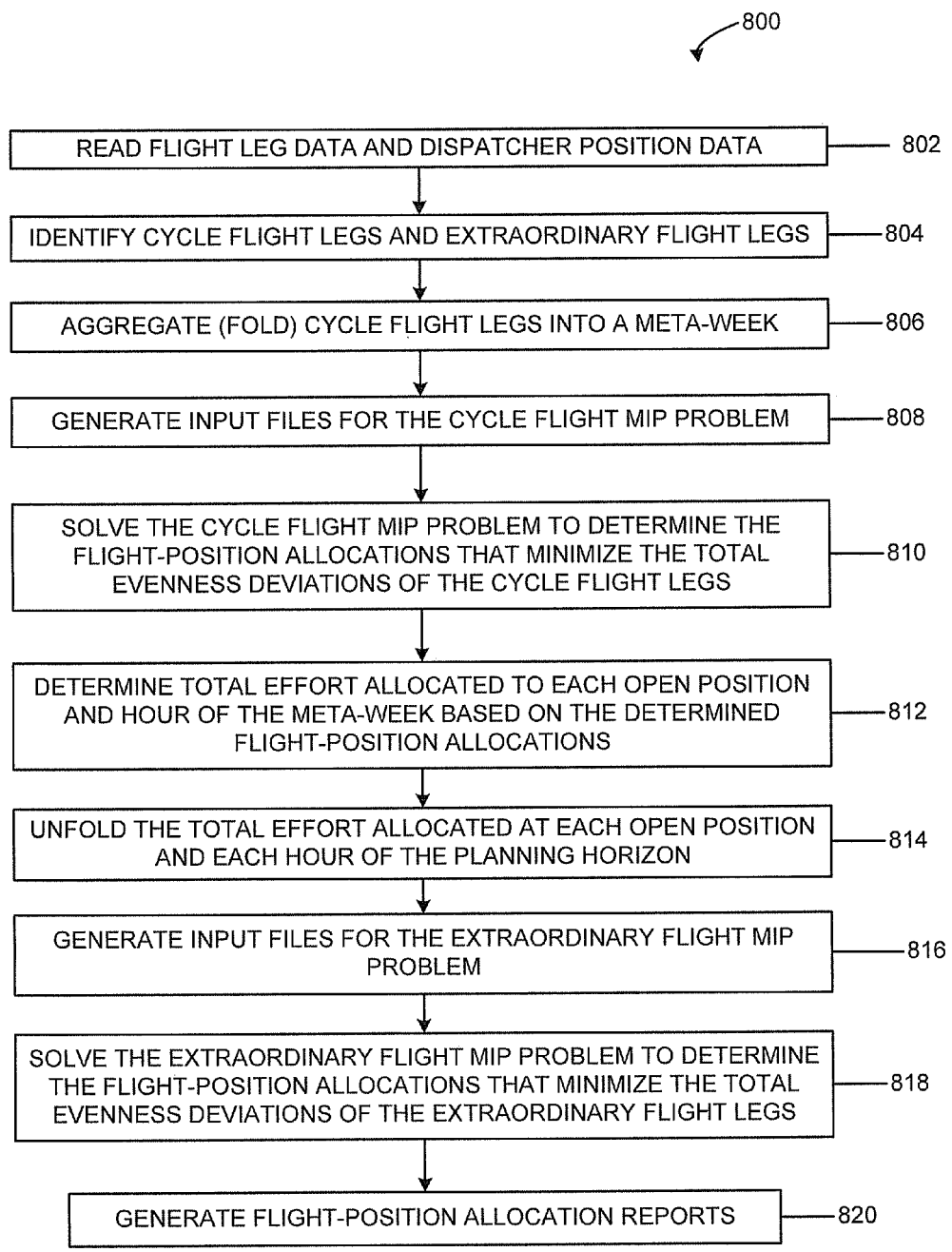
FIG. 8 is a flow diagram illustrating another example of a method for optimizing the distribution of workload to dispatcher positions.

FIG. 8 is a flow diagram illustrating another example of a method 800 for optimizing the distribution of workload to dispatcher positions. In one example, method 800 is implemented by dispatcher workload distribution processing system 200 previously described and illustrated with reference to FIG. 2. At 802, the flight leg data and the dispatcher position data are read. At 804, the cycle flight legs and the extraordinary flight legs are identified based on the flight leg data. At 806, the cycle flight legs are aggregated (i.e., folded) into a meta-week. At 808, input files for the cycle flight MIP problem are generated. In one example, the input files are then put through a validation test and any issues found by the validation test are reported out. At 810, the cycle flight MIP problem is solved to determine the flight-position allocations that minimize the total evenness deviation of the cycle flight legs. In one example, the flight position-allocations are then put through a validation test and any issues found by the validation test are reported out.

At 812, the total effort allocated to each open dispatcher position and hour of the meta-week is determined based on the determined flight-position allocations. At 814, the total effort allocated at each open dispatcher position and each hour is unfolded for the planning horizon. At 816, input files for the extraordinary flight MIP problem are generated. In one example, the files are then put through a validation test and any issues found by the validation test are reported out. At 818, the extraordinary flight MIP problem is solved to determine the flight-position allocations that minimize the total evenness deviations of the extraordinary flight legs. In one example, the flight-position allocations are then put through a validation test and any issues found by the validation test are reported out. At 820, flight-position allocation reports are generated. In one example, the flight-position allocation reports indicate the flight legs and associated effort assigned to each dispatcher position at each hour of each day during the planning horizon.

FIG. 9 is a table 900 illustrating one example of a flight-position allocation report. In one example, table 900 is a portion of the output provided by the dispatcher workload distribution system. In this example, dispatcher position 12 as indicated at 902 has been allocated to flight leg FLIGHT100 as indicated at 904. The flight leg FLIGHT100 is on Tuesday as indicated at 906, Jan. 18, 2011 from 1500 hours to 2100 hours as indicated at 908. The effort for each hour of the flight leg is one minute as indicated at 910. In other examples, other suitable flight-position allocation reports may be generated by position, by flight leg, by day, by hour, or by another suitable attribute.

Figure 10:
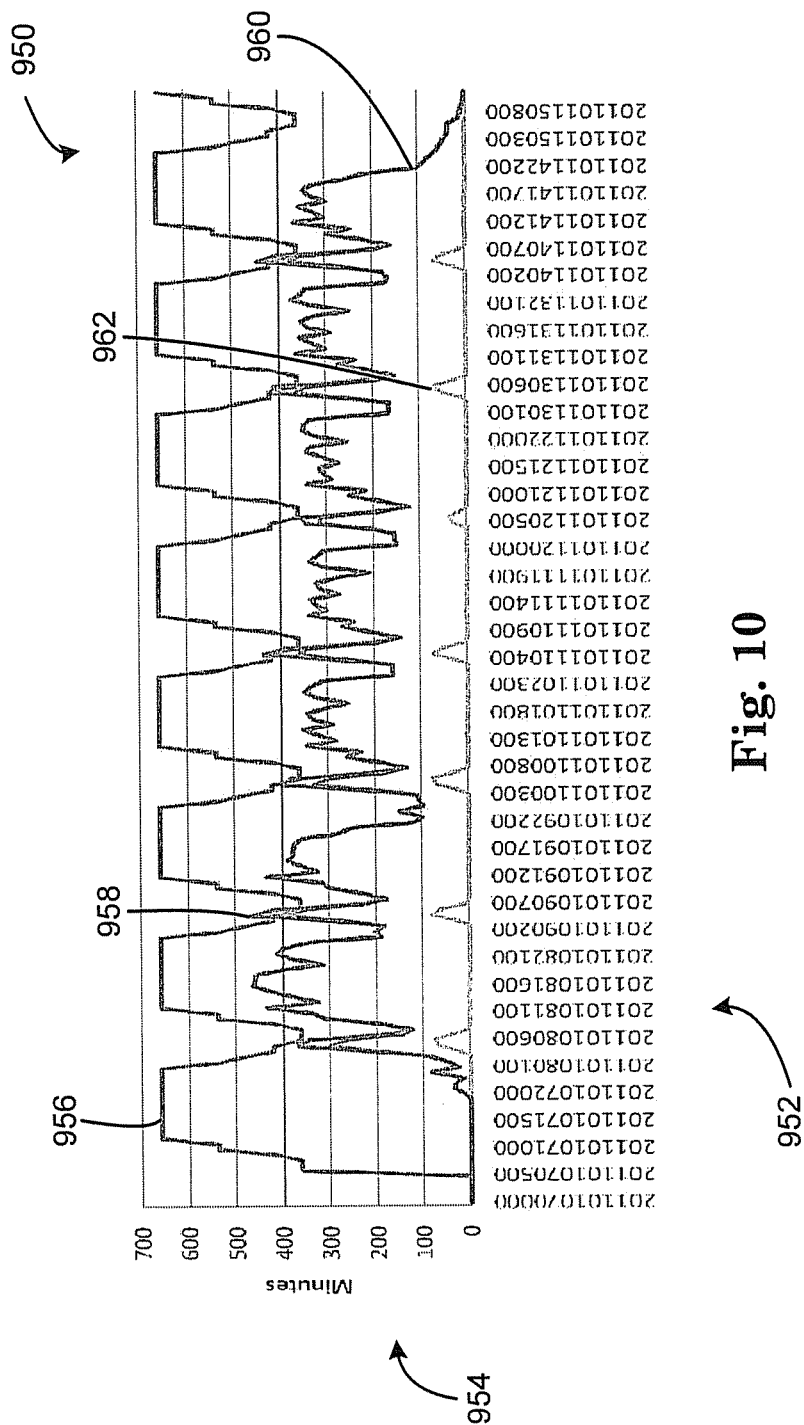
FIG. 10 is a chart illustrating one example of a summarization of an overall flight-position allocation.

FIG. 10 is a chart 950 illustrating one example of a summarization of an overall flight-position allocation for a planning horizon. The x-axis 952 indicates an hour identifier for each hour of the planning horizon, and the y-axis 954 indicates the effort in minutes. Chart 950 includes the total capacity at each hour of the planning horizon as indicated at 956, the total effort of the flight legs to be allocated at each hour of the planning horizon as indicated 958, the fulfilled effort at each hour of the planning horizon as indicated at 960, and the unfilled effort at each hour of the planning horizon as indicated at 962. Unfilled effort may be due to a lack of capacity (either regular or overtime) at the hour or due to a splitting rule being violated. Based on chart 950, the user of the dispatcher workload distribution system may add dispatcher positions, modify the open hours of the dispatcher positions, increase the maximum allowable over capacity for the dispatcher positions, and/or perform other suitable adjustments. In this way, the total effort at each hour of the planning horizon may be fulfilled such that there is no unfilled effort.

In one example, the MIP model for the dispatcher workload distribution system includes the following indices, parameters, computed parameters, decision variables, and MIP formulation.

Indices f∈F: Index and set of flight legs.

i, j∈I: Index and set of dispatcher positions.

h∈H: Index and set of hours during planning horizon (e.g., 1 month).

r: Index for replicas of flight leg f. A replica of a flight leg is the day that the flight departs.

Parameters effor(f,r,h): The effort (e.g., in minutes) of replica r of flight leg f during each hour h of the planning horizon.

plan(f,r,h): plan(f,r,h)=1 indicates if hour h is a planning period of replica r of flight leg f.

follow(f,r,h): follow(f,r,h)=1 indicates if hour h is a following period of replica r of flight leg f.

regcap(i,h)≥0: The regular capacity available (e.g., in minutes) of position i during each hour h of the planning horizon.

overcap(i,h) 0: The over capacity available (e.g., in minutes) of position i during each hour h of the planning horizon.

maxpos(f): Maximum number of positions allowed for flight leg f (e.g., three positions).

Computed Parameters m(f,r,h): indicates if replica r of flight leg f requires an effort during hour h.

m(f,r,h)=1 if effor(f,r,h)>0, and 0 otherwise.

replica(f,r): indicates that r is a replica of flight leg f.

$$\text{replica}(f, r) = 1 \text{ if } \sum_h m(f, r, h) > 0,$$

and 0 otherwise.

numrep(f): Number of replicas of flight leg f.

$$\text{numrep}(f) = \sum_r \text{replica}(f, r).$$

$$\text{numpos}(h) = \sum_{i \in I} 1_{\text{regcap}(i,h) > 0},$$

i.e. number of open positions at hour h.

frh={(f,r,h): effor(f,r,h)>0}: Set of replicas of flights that have effort at each hour of the planning horizon.

ih={(i,h):regcap(i,h)>0}: Set of open dispatcher positions at each hour of the planning horizon.

frh={(i,f,r,h):regcap(i,h)*effor(f,r,h)>0}: Set of dispatcher positions that can fulfill effort of replicas of flight legs at each hour of the planning horizon.

$$ifr = \left\{(i, f, r): \bigcup_{h \in H} ifrh(h)\right\}:$$

Set of valid dispatcher position, flight leg, and replica.

$$pf = \left\{(i, f): \bigcup_r ifr(r)\right\}:$$

Set of valid dispatcher position, and flight leg.

(i,j,f,r,h−1,h)∈ijfrh1h: For a flight leg f at a replica r this is the set of feasible combinations of switching from dispatcher position i at hour h−1 to position j at hour h.

(i,j,f,r,h)∈ijfrh: This set (i.e., table) is derived from set ijfrh1h by removing the column associated with hour h−1.

Decision Variables $z_{i,f,r,h}$=1 if effort effor(f,r,h)>0 is allocated to position i.

$xdz_{f,r,h}$=1 if effort effor(f,r,h)>0 cannot be fulfilled by any open dispatcher position at hour h.

$xtoteff_{i,h} \geq 0$: Total effort allocated to dispatcher position i at hour h.

$0 \leq xovertime_{i,h} \leq overcap(i,h)$: Overtime allocated to dispatcher position i during hour h.

$xover_{i,h} \geq 0$: Over-allocation of capacity at dispatcher position i at hour h (i.e., more capacity than the average utilization was allocated).

$xunder_{i,h} \geq 0$: Under-allocation of capacity at dispatcher position i at hour h (i.e., less capacity than the average utilization was allocated).

$0 \leq xd_{f,r,h} \leq effor(f,r,h)$: Artificial variable to allow that the effort of replica r of flight leg f is not fulfilled at hour h.

$zh_{i,f,r}$=1 if dispatcher position i is allocated to replica r of flight leg f at any hour of the planning horizon, and 0 otherwise.

$zhr_{i,f}$=1 if dispatcher position i is allocated to flight leg f at any hour of the planning horizon, and 0 otherwise.

$u_{i,f,r}$=1 if dispatcher position i is allocated to replica r of flight leg f at all hours of the planning horizon, and 0 otherwise.

$zr_{i,f,h}$=1 if dispatcher position i fulfills the effort of flight leg f at hour h for all identical replicas r.

$zl_{i,f,r}$=1 indicates that only dispatcher position i has been allocated throughout the whole life of the flight leg f at replica r.

MIP Formulation

0) Objective Function: Minimize penalties reflecting violating the various aims of the dispatcher workload distribution problem.

$$\text{Min penalties} = evencst * \sum_{(i,h) \in ih} (xover_{i,h} + xunder_{i,h}) + splitcst *$$

$$\sum_{(i,f,r) \in ifr} \left( \sum_{h \in ifrh} effor(f, r, h) * z_{i,f,r,h} - zl_{i,f,r} * \sum_{h \in frh} effor(f, r, h) \right) +$$

$$bigm * \sum_{(f,r,h) \in frh} xdz_{f,r,h}$$

1) Satisfy Demand: Satisfy effort using binary variables z. Notice that the equation will set a variable z=1 to indicate that one dispatcher position fulfills the effor(f,r,h), and if not possible an artificial variable for unfilled effort will be set to one. For each effort effor(f,r,h)>0 allocate a dispatcher position i to fulfill the effort. For each (f,r,h)∈frh $$\sum_{i \in ifrh} z_{i,f,r,h} = 1 - xdz_{f,r,h}$$

2) Total Effort at Dispatcher Position: Compute total effort as a function of binary variables z. For each dispatcher position i and open hour such that total capacity>0, compute total effort that is fulfilled. For each (i,h)∈ih $$\sum_{(f,r) \in ifrh} effor(f, r, h) * z_{i,f,r,h} = xtoteff_{i,h}$$

3) Satisfy Position Capacity: For each position i and open hour such that regcap(i,h)>0, satisfy position capacity constraints. For each (i,h)∈ih $$xtoteff_{i,h} \leq regcap(i,h) + xovertime_{i,h}$$

4) Overtime Constraints: For each (i,h)∈ih $$xovertime_{i,h} \leq overcap_{i,h}$$

5) Deviation of Total Effort with Respect to Regular Capacity: For each position i and open hour h such that (i,h)∈ih, compute over or under deviation of position utilization with respect to average utilization.

$$xover_{i,h} - xunder_{i,h} = \frac{xtoteff_{i,h}}{totcap(i, h)} - \left(\frac{1}{numpos(h)}\right) \sum_{j \in ih} \frac{xtoteff_{j,h}}{totcap(j, h)}$$

6) Indicate if Dispatcher Position has been Assigned to a Replica of a Flight Leg: This constraint for zh=1 indicates whether i is allocated to f-r or not. For each replica r of a flight leg f, indicate if dispatcher position i has been allocated to fulfill effort at some hour during the planning horizon. For each (i,f,r)∈ifr $$\sum_{h \in ifrh} effor(f, r, h) * z_{i,f,r,h} \leq zh_{i,f,r} * \sum_{h \in frh} effor(f, r, h)$$

7) Maximum Number of Positions Allocated per Replica of Flight Leg: For each replica r of flight leg f, at most assign maxpos(f) dispatcher positions to it. Then, for each (f,r) such that replica(f,r)=1 satisfy $$\sum_{i \in ifr} zh_{i,f,r} \leq maxpos(f).$$

8) Planning Period Cannot be Split: For each replicate r of flight leg f and effort hour h of the planning period, ensure all planning period is fulfilled by same dispatcher position i. For each (i,f,r)∈ifr $$\sum_{h \in ifrh} plan(f, r, h) * effor(f, r, h) * z_{i,f,r,h} = u_{i,f,r} * \sum_{h \in frh} plan(f, r, h) * effor(f, r, h)$$

9) Only One Position is Considered During Planning Period: Add a constraint that ensures that only one position is allocated during the planning period of f−r. Then for each (f,r)∈fr satisfy $$\sum_{i \in ifr} u_{i,f,r} \leq 1$$

10) Indicate that Only One Dispatcher Position has been Allocated to Flight Leg: For each dispatcher position i and replica r of flight leg f indicate if only one dispatcher position has been used at all hours of the planning and following periods. For each (i,f,r)∈ifr $$\sum_{h \in ifrh} effor(f, r, h) * z_{i,f,r,h} \geq z1_{i,f,r} * \sum_{h \in frh} effor(f, r, h)$$

11) Consider Switching Penalties from One Dispatcher Position to Another: This constraint flags whenever a flight leg f at replica r switches from dispatcher position i at hour h−1 to dispatcher position j at hour h. For each (i,j,f,r,h−1,h) ∈iffrh1h $$z_{i,f,r,h-1} + z_{j,f,r,h} \leq 1 + v_{i,j,f,r,h}$$

12) At Most, Two Switches Can Happen Per Flight Leg During Following Period: For each (f,r)∈fr satisfy $$\sum_{i,j,h \in ijfrh} v_{i,j,f,r,h} \leq 2$$

13) At Most, One Switch From Dispatcher Position i to j During Following Period of f-r. For each (i,j,f,r)∈ijfr satisfy $$\sum_{h \in ijfrh} v_{i,j,f,r,h} \leq 1$$

14) If i Switch to j then i Cannot be Allocated Again to f-r: For each (i, j,f,r,h)∈ijfrh satisfy $$\sum_{hh \geq h} z_{i,f,r,hh} \leq Dur_{f,r} * (1 - v_{i,j,f,r,h})$$

15) If i is Not Allocated to f-r at h−1 then Cannot Switch From i to j at h: If dispatcher position i has not been allocated to f-r at hour h−1, then there cannot be a switching from i to j at hour h. For each (i,j,f,r,h)∈ijfrh∩ifrh satisfy $$z_{i,f,r,h-1} \geq v_{i,j,f,r,h}$$

16) Ensure Flight f-r is Completely Fulfilled or Not: This equation ensures that a flight f-r is either completely fulfilled or not fulfilled at all. For each (f,r)∈fr satisfy $$\sum_{i,h \in ifrh} z_{i,f,r,h} = Dur_{f,r} * y_{f,r}$$

17) Force y=0 Whenever xdz=1: If flight f-r cannot be fulfilled at some period h then the complete flight is not filled at all. For each (f,r,h)∈frh satisfy $$1 - xdz_{f,r,h} \geq y_{f,r}$$

In other examples, the above MIP model can vary based how the user of the dispatcher workload distribution system prioritizes each constraint and rule of the MIP model.

Examples provide a dispatcher workload distribution system to enable the optimization of the allocation of dispatcher positions to flight legs during a planning horizon. In one example, the dispatcher workload distribution system minimizes the total deviation of the utilization of an open position at an hour and the average utilization of all open positions at that hour, for all open positions and hours of the planning horizon. Therefore, the workload distribution of open positions at each hour during the planning horizon is balanced and optimized (i.e., the amount of work assigned to each position does not vary significantly from position to position).

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A method for distributing workload to dispatcher positions, the method comprising:
   receiving, via a processing system, a plurality of flight leg attributes for each flight leg within a planning horizon, each flight leg having effort to be assigned;
   receiving, via the processing system, a plurality of position attributes for each position available to be assigned effort within the planning horizon;
   aggregating, via the processing system, flight legs within the planning horizon that repeat during the planning horizon into a meta-period;
   assigning, via the processing system, effort of the aggregated flight legs within the meta-period to positions within the meta-period;
   deaggregating, via the processing system, the assigned effort of the aggregated flight legs within the meta-period to the respective positions throughout the planning horizon; and
   assigning, via the processing system, effort of flight legs within the planning horizon that do not repeat during the planning horizon to the positions.

2. The method of claim 1, wherein assigning effort of the aggregated flight legs within the meta-period to positions within the meta-period comprises minimizing a workload deviation between all positions assigned effort at each hour of each day.

3. The method of claim 1, wherein assigning effort of the aggregated flight legs within the meta-period to positions within the meta-period comprises minimizing a number of positions assigned to each flight leg.

4. The method of claim 1, wherein assigning effort of the aggregated flight legs within the meta-period to positions within the meta-period comprises maximizing the consistency of the assignments of repeated flight legs to each position.

5. The method of claim 1, wherein each flight leg has a pre-flight period and an in-flight period, and
   wherein assigning effort of the aggregated flight legs within the meta-period to positions within the meta-period comprises assigning, for each flight leg, the pre-flight period to one position and the in-flight period to a maximum of two positions.

6. A system comprising:
   a processor; and
   a memory communicatively coupled to the processor, the memory storing instructions causing the processor, after execution of the instructions by the processor, to:
   receive flight leg data for each flight leg within a planning horizon,
   receive position data for each position available to be assigned flight legs within the planning horizon;
   fold flight legs within the planning horizon that repeat during the planning horizon into a meta-week;
   allocate each flight leg within the meta-week to at least one position within the meta-week;
   unfold the allocated flight legs within the meta-week to the respective positions throughout the planning horizon; and
   allocate flight legs within the planning horizon that do not repeat during the planning horizon to at least one position within the planning horizon.

7. The system of claim 6, wherein the memory stores instructions causing the processor, after execution of the instructions by the processor, to assign each flight leg within the meta-week to at least one position within the meta-week by:
   ordering the flight legs within the meta-week from higher repetition to lower repetition; and
   allocating the flight legs to positions in order from higher repetition to lower repetition.

8. The system of claim 6, wherein the memory stores instructions causing the processor, after execution of the instructions by the processor, to allocate flight legs within the planning horizon that do not repeat during the planning horizon by:
   ordering the flight legs from longer duration to shorter duration; and
   allocating the flight legs to positions in order from longer duration to shorter duration.

9. The system of claim 6, wherein the memory stores instructions causing the processor, after execution of the instructions by the processor, to further:
   pre-assign a specified flight leg to a specified position prior to assigning each flight leg within the meta-week to at least one position within the meta-week.

10. The system of claim 6, wherein the memory stores instructions causing the processor, after execution of the instructions by the processor, to assign each flight leg within the meta-week to at least one position within the meta-week by:
    generating input files for a mixed integer programming problem for the flight legs within the meta-week, and
    solving the mixed integer programming problem using the input files.

11. The system of claim 6, wherein each position may be over utilized up to a specified number of minutes.

* * * * *